J. Gibbs.

Grinding Plow-Castings.

No 2963 Reissued Jun. 2, 1868.

United States Patent Office.

JOSHUA GIBBS, OF CANTON, OHIO.

*Letters Patent No.* 10,068, *dated October* 4, 1853; *extended seven years; reissue No.* 2,963, *dated June* 2, 1868.

IMPROVEMENT IN MACHINE FOR GRINDING PLOUGH-CASTINGS.

The Schedule referred to in these Letters Patent and making part of the same.

TO ALL WHOM IT MAY CONCERN:

Be it known that I, JOSHUA GIBBS, of Canton, in the county of Stark, and State of Ohio, have invented certain new and useful Improvements in Plough-Grinding and Polishing-Machines; and I do hereby declare that the following is a full, clear, and exact description of the same, reference being had to the accompanying drawings, and to the letters of reference marked thereon.

In the annexed drawings—

Figure 1:
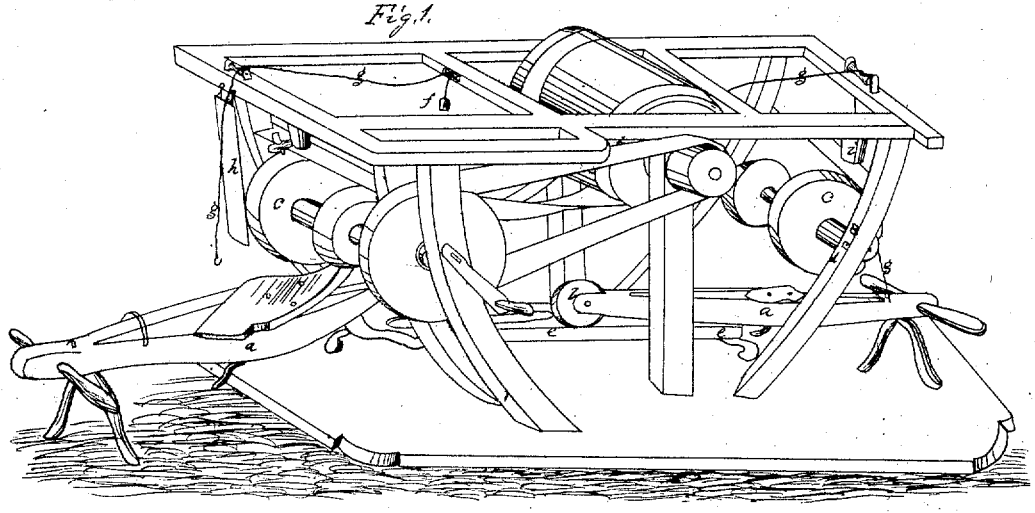
Figure 2:
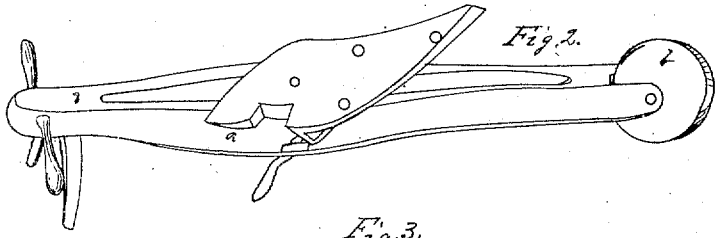
Figure 3:
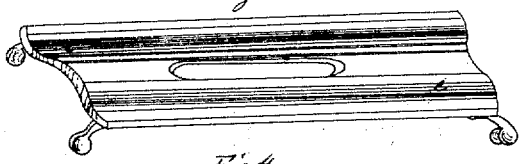
Figure 4:
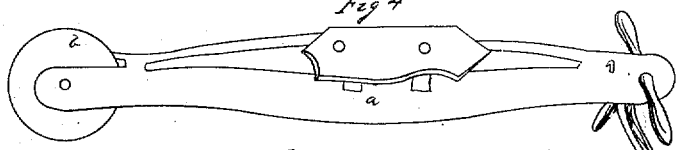
Figure 5:
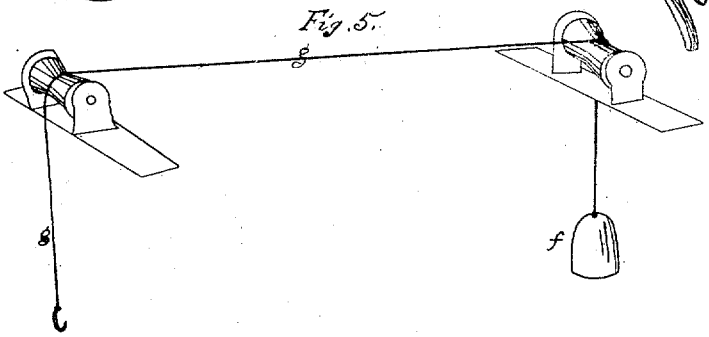

Figure 1 represents a perspective view of my machine.

Figures 2, 3, 4, and 5, represent detached views of parts of the machine.

I mount the stone or stones, *c c*, seen in fig. 1, upon or in a frame of any suitable shape or form, and said stones are rotated to any desired velocity by suitable drums or pulleys, or other gearing.

*a* represents a carriage or frame, which is provided at one end with a wheel, *b*, and at the other with legs, upon which it may rest, and also with handles by means of which it may be operated.

The work which is to be ground or polished, or operated upon by the grind or polishing-stone, is placed upon this carriage or frame, and is there secured by any suitable device.

H represents a stand or table, which is provided with grooves, *e e*, in which the carriage-wheels run, said frame or stand serving to support one end of the carriage, as said carriage is moved to and fro, beneath the stone, by the hands of the operator. The table or stand is placed at the opposite side of the stone from that at which the operator stands.

It will readily be seen that the carriage or frame *a*, rolling upon its wheel or wheels at one end, and being held in the hands of the operator at the other, can be adjusted longitudinally or laterally, or tilted to one side or the other at will, to suit the inequalities or the peculiar nature of the work.

*f* represents a weight, attached to one end of a rope, belt, or chain, *g*, while the other end, passed up over pulleys, may be attached to that end of the carriage where the operator stands, for supporting said end of the carriage, and thus relieving the weight in the hands of the operator.

A water-vessel may be placed over the stone, for supplying it with water, if necessary.

*h* represents a shield, depending before the stone, to protect the operator from the water thrown by the centrifugal force of the stone.

At *d* will be seen a slot or curved mortise and device for the lowering of the stone as it wears away, thus always keeping the carriage at a convenient height.

By the use of this machine I am enabled to grind or polish, with great ease and facility, not only all kinds of plough-castings, but also a great variety of other work, whether of regular or irregular shape.

The operator, by lifting the carriage or frame, is enabled to touch the work as lightly to the face of the stone as may be desirable, and, being enabled to see it clearly, regulates the pressure with reference to the nature and requirements of the work.

Having thus fully described my invention, what I claim as new, and desire to secure by Letters Patent, is—

1. A frame or carriage, beneath a grindstone or polishing-wheel, supported at one end by any suitable device, and at the other by the hands of the operator; said frame being capable of a lateral longitudinal and oscillating adjustment during the process of grinding, for the purpose of adapting the stone to uneven, irregular, or plane surfaces of articles to be ground or polished, as is herein set forth.

2. In combination with a carriage, supported and operated as above described, beneath a grindstone or polishing-wheel, I claim a cord or rope, or its equivalent, for relieving a portion of the weight of the frame in the hands of the operator, as is herein set forth.

In testimony that I claim the foregoing, I have hereunto set my hand, this 24th day of January, 1868.

JOSHUA GIBBS.

Witnesses:

A. BIERCE,

GEO. W. RAFF.